United States Patent [19]

Watanabe

[11] Patent Number: 5,433,424
[45] Date of Patent: Jul. 18, 1995

[54] ANTI-BACTERIAL CHOPPING BOARD

[75] Inventor: Tadao Watanabe, Tsuchiura, Japan

[73] Assignee: Daikyo Co., Ltd., Tsuchiura, Japan

[21] Appl. No.: 57,677

[22] Filed: May 5, 1993

[30] Foreign Application Priority Data

Feb. 16, 1993 [JP] Japan ................... 5-048743

[51] Int. Cl.⁶ ............................................. B23Q 3/00
[52] U.S. Cl. ............................. 269/289 R; 269/286;
264/349; 524/322; 524/450
[58] Field of Search ............ 269/289 R, 286;
264/145, 175, 210.1, 211, 284, 320, 349, 322, 450

[56] References Cited

U.S. PATENT DOCUMENTS

| 4,452,936 | 6/1984 | Grimm | 524/322 |
| 4,960,819 | 10/1990 | Sandstrom et al. | 524/516 |
| 5,085,416 | 2/1992 | Miyake et al. | 269/289 R |
| 5,162,425 | 11/1992 | Sndstrom et al. | 524/516 |

FOREIGN PATENT DOCUMENTS

| 55-6372 | 2/1980 | Japan . | |
| 1-46464 | 2/1989 | Japan . | |
| 1-185226 | 7/1989 | Japan | 269/289 R |
| 2-71717 | 3/1990 | Japan | 269/289 R |
| 2-295524 | 12/1990 | Japan | 269/289 R |
| 3-193014 | 8/1991 | Japan | 269/289 R |
| 3-193015 | 8/1991 | Japan | 269/289 R |
| 3-195522 | 8/1991 | Japan | 269/289 R |
| 3-198822 | 8/1991 | Japan | 269/289 R |
| 2250909 | 6/1992 | United Kingdom | 269/289 R |

Primary Examiner—Jay H. Woo
Assistant Examiner—Duane S. Smith
Attorney, Agent, or Firm—Dilworth & Barrese

[57] ABSTRACT

A chopping board of the present invention is formed in a manner that synthetic rubber (NBR) and hard chloroethene as a basis are kneaded into a mixture wherein an anti-bacterial agent is mixed. Definitely, a stiffening agent of synthetic rubber, low-pressure polyethylene resin, white carbon black which is the reinforcing extender of rubber, zinc flower as a reinforcing accelerator of rubber, titanium as a coloring agent and stearic acid as a dispersion accelerator are mixed with the base of synthetic rubber(NBR) and hard chloroethene. The mixture thus obtained is agitated under kneading by a kneader exclusively for rubber and then a ceramic power and an inorganic anti bacterial agent are mixed with the kneaded mixture so as to mold the chopping board.

6 Claims, No Drawings

ANTI-BACTERIAL CHOPPING BOARD

BACKGROUND OF THE INVENTION

The present invention relates to an anti-bacterial chopping boaard wherein synthetic rubber(NBR) and hard chloroethene as a basis are kneaded and further an anti-bacterial agent is mixed therewith and a method of manufacturing the same.

Hitherto, a conventional chopping board wherein an anti-bacterial agent is mixed into a chopping board of synthetic resins such as polyethylene, etc., is known as disclosed, for example, in Japanese patent publication No. 6372/1980 or Japanese patent laid-open publication No. 46464/1989.

However, according to the aforementioned conventional chopping board, single synthetic resin such as polyethylene, etc., is employed as the basis of said chopping board and an anti bacterial agent is further added thereto. In the case where hard synthetic resin such as polyethylene is employed as a basis of the chopping board as above described, there was such inconvenience that the sense of soft touch of a kitchen knife to the chopping board can not be obtained. On the other hand, however, when soft synthetic resin is employed as the basis of the chopping board, some apprehensions still remained in the degree of hardness or flexural strength, etc., which is required for the chopping board. In any event, there was a problem that it was difficult to allow the sense of the chopping board material to come near the sense of a wooden chopping board.

SUMMARY OF THE INVENTION

With the above in mind, it is an object of the present invention to provide an anti bacterial chopping board wherein synthetic rubber and hard chloroethene are employed as a base. It is another object of the present invention to provide a method of manufacturing the aforementioned chopping board.

The aforementioned objects can be attained by the anti-bacterial chopping board manufactured by the following process comprising a stiffening agent of synthetic rubber, low-pressure polyethylene resin, white carbon black as a rubber reinforcing extender, zinc flower as a rubber reinforcing accelerator, titanium as a colouring agent and stearic acid as a dispersion accelerator being compounded to the basis of synthetic rubber(NBR) and hard chloroethene as shown in the following weight compounding ratio, said compound thus obtained being kneaded under agitation by means of a kneader exclusive for rubber, ceramic powder and inorganic anti-bacterial agent being mixed by the following weight compounding ratio into the kneaded mixture obtainable under the agitation described above, thereby carrying out a molding operation.

| | |
|---|---|
| 1. Synthetic rubber (NBR) | 24–36% |
| 2. Hard chloroethene | 40–56% |
| 3. Stiffening agent of the synthetic rubber | 3–8% |
| 4. Low-pressure polyethylene | 2–8% |
| 5. White carbon black | 6–10% |
| 6. Zinc flower | 1–4% |
| 7. Titanium | 1–4% |
| 8. Stearic acid | 0.2–0.6% |
| 9. Ceramic powder | 2–6% |
| 10. Inorganic antibacterial agent | 0.4–6% |

According to the anti-bacterial chopping board manufactured by the aforementioned method, the sense of soft touch of a kitchen knife to the chopping board and further a grain pattern in appearance having an excellent oil resistance, heat resistance, chemical resistance, weatherability and hydrophilic property can respectively be obtained due to the characteristics of the aforementioned raw materials. Thus, said chopping board with satisfactory strength and weighty sense as well has the effect of an anti bacterial action due to the inorganic anti-bacterial agent.

DESCRIPTION OF THE PREFERRED EMBODIMENTS

Hereinafter, embodiment according to the present invention will be described in detail.

When a total weight of the compound of the chopping board according to the present invention is 50 kg;

1. 12–18 kg of synthetic rubber(nitrile-butadiene rubber) with excellent oil resistance (Preferably 14 kg)

In the case of less than 12 kg, the hardness of a kneaded mixture becomes too high, while on the other hand, the hardness becomes too low in the case of more than 18 kg.

2. 20–28 kg of hard chloroethene for the purpose of reinforcing a defect of synthetic rubber i.e. the degeneration of the synthetic rubber caused by ozone generated from an anti-bacterial agent due to synergistic effect with low-pressure polyethylene resin described hereinafter. (Preferably 23 kg)

In the case of less than 20 kg, the kneaded mixture lacks ozone-proof and further the hardness becomes too low, while on the other hand the hardness becomes too high in the case of more than 28 kg. An appropriate hardness of a chopping board is 85–90 degree according to the unit of a rubber hardness meter (GS 710 Type made by Teclock Co., Ltd.) and the rubber hardness of hard chloroethene is 90 degree.

3. 1.5–4 kg of high styrene as a stiffening agent of synthetic rubber, wherein 40–85% of styrene resin is mixed with styrene butadiene rubber (SBR).

In the case of less than 1.5 kg, it is impossible to ensure the appropriate hardness of a chopping board due to non-action as the stiffening agent, while on the other hand oil resistance of the chopping board is imperfect.

4. In order to ensure the appropriate hardness of the chopping board, 1–4 kg of flow-pressure polyethylene resin. (Preferably 2 kg)

In the case of less than 1 kg, it is impossible to ensure the appropriate hardness of the chopping board, while on the other hand it is impossible to knead the materials due to the slide thereof in a secondary kneading process in the case of more than 4 kg. The rubber hardness of low-pressure polyethylene resin is 70 degree.

5. As a reinforcing extender, 3–5 kg of HYTRON (manufactured by Takehara Kogyo (Industries) Co., Ltd.) or NIPPSEAL (manufactured by Japan Silica Industrial Co., Ltd.) which are kinds of white carbon blacks with an excellent hydrophilic property to water content required as the characteristics of a chopping board. (Preferably 3.8 kg)

In the case of less than 3 kg, the hydrophilic property on the surface of the chopping board is imperfect, while on the other hand chips generated from the chopping board on use are apt to stick to a kitchen knife or cooling materials in the case of more than 5 kg.

6. 0.5–2 kg of zinc flower as the reinforcer and dispersion accelerator of rubber. (Preferably 1 kg)

In the case of less than 0.5 kg, reinforcing and dispersion acceleration actions are imperfect, while on the other hand heavy metal(zinc) contained in the zinc flower exceeds a prescribed value in the case of more than 2 kg.

7. As a white pigment with excellent chemical resistant and weatherability, 0.5-2 kg of titanium oxide which is as metallic element. (Preferably 1 kg)

In the case of less than 0.5 kg, it is not sufficient to bring out a tone of light brown, while on the other hand the tone has more whit than the other colors on the whole in the case of more than 2 kg.

8. 0.1-0.3 kg of stearic acid as the dispersion accelerator of rubber. (Preferably 0.2 kg)

In the case less than 0.1 kg, a dispersion acceleration action is not sufficient, while on the other hand the vulcanization of synthetic rubber is generated in a first and a secondary kneading processes in the case of more than 0.3 kg and therefore a final finishing operation of vulcanizing the synthetic rubber in a further thermal press process is imperfect.

9. 1-3 kg of ceramic powders ( with the effect of a far infrared ray as the dispersion accelerator of rubber. (Preferably 1.6 kg)

In the case of less than 1 kg, a dispersion acceleration action is not sufficient, while on the other hand chips generated from a chopping board on use are apt to easily stick to a kitchen knife or cooking materials in the case of more than 3 kg.

10. When an inorganic anti-bacterial agent, which is the basis of an anti bacterial effect, e.g. 0.2-3 kg or BACTEKILLER (Japanese Trademark Registration No. 1,712,881, manufactured by Kanebo Co., Ltd., an inorganic agent forming the basis of an antibacterial effect), preferably 0.4 kg, are kneaded into the basis of synthetic rubber and hard chloroethene, thereby displaying an anti,bacterial action in a uniformly and evenly dispersed state in the mixture. Said inorganic anti bacterial agent is powdered zeolite, wherein one or the whole of metals contained in said zeolite is substituted by at least one kind of ion exchangeable metals selected from the group consisting of Ag,Cu and Zn.

a. The material thus obtained under kneading as described above is agitated by means of a kneader exclusive for rubber. At that time, a suitable temperature is 80-100 C. In the case of a higher temperature than the above, rubber property is excessively parched and thus rubber component becomes vulcanized rubber from crude rubber, thereby impeding the fusion of rubber and resin in a further molding process.

In the case of less temperature than the above, the material is not fused and as a result the mixture under agitation is not suffice even after a necessary time is passed. At that time, the time necessary for mixture under kneading by means of the a kneader is 10-20 minutes around. (First kneading process) Ceramic powder and inorganic antibacterial agent are kneaded with the mixture in 6-7 minutes after commencement of this first kneading process.

b. The material thus mixed under kneading by means of a kneader is further kneaded by means of a rubber roll in order to heighten the density of a high polymer. (Secondary kneading process) That is to say, at first the distance of rolls is set to be 5-6 mm so as to knead the mixture for 4-7 minutes and subsequently said distance is further reset to be 1.5-3 mm to knead the material so as to press it easily and then the material wound about the roll is taken out partially by cutting. (Sheeting)

c. The, material thus taken out is arranged to a suitable size in conform to a die by cutting said material in length and width by means of a cutting machine. (Cutting process)

d. The material thus cut is charged into a die of a hydraulic press machine so as to actuate thermal press under 190-210 kg/cm$^2$, preferably 200 kg/cm$^2$. (Thermal pressing process)

As an example, in the case of a standarized article (40 cm length $\times$ 24 cm width $\times$ 1.4 cm thickness), a suitable temperature of the thermal press is 150°-170° C. and a suitable time for pressing is 5-20 minutes, preferably 5-10 minutes in view of a production. When the standard of a chopping board is changed, each required condition may suitably be changed on the base of the standardized article as above described.

e. The product taken from thermal press is suitably shaped by cutting burrs adhered to the sides of said product by means of a cutter knife etc and then is cooled for 5-10 minutes after putting the die exclusive for cooling. (Cooling process)

At that time, a temperature of said die is thermally controlled by means of a spot cooler, etc., in order not to exceed the maximum temperature 40° C. (A prescribed maximum value of a cooling temperature is suitably arranged within the range from one third-one fourth of a first thermal press).

f. The product taken out after cooling is shaped depending upon an individual size and a chopping board with 90% of the finished article can be obtained.

Next, since the surface of said chopping board is slippery, said surface is ground by means of a grinder so as to refrain cooking materials such as meats, vegetables, fish, etc., from slipping on the surface thereof, so that a stable operation of a kitchen knife may be possible. (Grinding process)

A grain pattern can be brought about on the surface of the chopping board by grinding the surface thereof by means of a grinder in spite of a product made of synthetic rubber, so that an appearance can be considerably be improved. The surfaces of the chopping board have a grain pattern in appearance like a wooden chopping board.

Definitely, it is suitable to employ abrasives obtainable for the roughness of abrasives grain size No.40-80 (abrasives in which aluminium oxide etc is bounded to nylon material or a sandpaper etc).

Lastly, chips generated by grinding which sticks to the surface of a chopping board is cleaned out and further the peripheral corners of the chopping board are filed for planing off the corner smooth so as to complete the chopping board as a final product. The chopping board thus obtained has an excellent sense of use and appearance which could not be obtained by a conventional anti bacterial chopping board. The antibacterial chopping board presents the sense of soft touch to a kitchen knife.

According to a conventional extrusion molding, it was difficult to carry out due to considerable differences of hardness of material and melting temperature, but according to the chopping board of the present invention an accurate and neat chopping board can be obtained one by one by the press molding.

What is claimed is:

1. An antibacterial chopping board comprising the combination of the following ingredients 1-10 blended together to provide a uniform mixture in the following weight percents based on the total mixture:

| Ingredient | Weight Percent |
| --- | --- |
| 1. Nitrile-butadiene rubber (NBR) | 24–36 |
| 2. Hard chloroethene | 40–56 |
| 3. Stiffening agent for the NBR | 3–8 |
| 4. Low-pressure polyethylene | 2–8 |
| 5. Carbon black | 6–10 |
| 6. Zinc flower | 1–4 |
| 7. Pigment | 1–4 |
| 8. Stearic acid | 0.2–0.6 |
| 9. Ceramic powder | 2–6 |
| 10. Inorganic antibacterial agent | 0.4–6 |

2. The antibacterial chopping board of claim 1, wherein (10) the inorganic antibacterial agent is powdered zeolite containing an ion exchangeable metal selected from the group consisting of Ag, Cu and Zn.

3. The antibacterial chopping board of claim 1, wherein
   (3) the stiffening agent for NBR is 40–85% of styrene resin mixed with styrene butadiene rubber (SBR),
   (5) the carbon black is selected from white carbon blacks, and
   (7) the pigment is titanium oxide.

4. The antibacterial chopping board of claim 3, wherein (10) the inorganic antibacterial agent is powdered zeolite containing an ion exchangeable metal selected from the group consisting of Ag, Cu and Zn.

5. The antibacterial chopping board according to claim 1, wherein surfaces of said chopping board have a grain pattern in appearance similar to a wooden chopping board.

6. The antibacterial chopping board of claim 1, having hardness of 85–90 degree, with the hardness of (2) the chloroethene being 90 degree.

* * * * *